United States Patent
Bedwani et al.

(10) Patent No.: US 7,356,555 B2
(45) Date of Patent: Apr. 8, 2008

(54) IN-PROTOCOL IMPEDANCE COMPENSATION CONTROL

(75) Inventors: Serge Bedwani, Folsom, CA (US); Thien Ern Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 1077 days.

(21) Appl. No.: 10/112,028

(22) Filed: Mar. 29, 2002

(65) Prior Publication Data

US 2003/0188069 A1 Oct. 2, 2003

(51) Int. Cl.
- H03K 17/16 (2006.01)
- H03K 19/003 (2006.01)
- G06F 13/42 (2006.01)
- G06F 13/14 (2006.01)
- G06F 15/16 (2006.01)

(52) U.S. Cl. .................. 709/200; 326/30; 710/105; 710/305; 709/203

(58) Field of Classification Search ........... 710/105, 710/305; 709/203; 326/30
See application file for complete search history.

(56) References Cited

U.S. PATENT DOCUMENTS

| | | | |
|---|---|---|---|
| 5,689,655 A * | 11/1997 | Tanaka et al. | 710/302 |
| 6,137,524 A | 10/2000 | Chea | |
| 6,331,785 B1 * | 12/2001 | Swanson et al. | 326/30 |
| 6,445,316 B1 * | 9/2002 | Hsu et al. | 341/120 |
| 6,541,996 B1 * | 4/2003 | Rosefield et al. | 326/30 |
| 6,549,357 B1 * | 4/2003 | Iroaga | 360/67 |
| 6,560,666 B1 * | 5/2003 | Harriman et al. | 710/305 |
| 6,573,747 B2 * | 6/2003 | Radhakrishnan | 326/30 |
| 6,624,659 B1 * | 9/2003 | Abraham et al. | 326/82 |
| 7,227,377 B2 * | 6/2007 | Kurts et al. | 326/30 |
| 2002/0118037 A1 * | 8/2002 | Kim et al. | 326/30 |

FOREIGN PATENT DOCUMENTS

EP 0367208 A2 5/1990

\* cited by examiner

*Primary Examiner*—John Follansbee
*Assistant Examiner*—Hassan Phillips
(74) *Attorney, Agent, or Firm*—Blakely, Sokoloff, Taylor & Zafman LLP

(57) ABSTRACT

One embodiment of a technique for performing impedance compensation update operations without causing potential data corruption problems includes taking advantage of protocol idle periods, where synchronization primitives, filler data, and alignment primitives are being transmitted. For example, a serial interconnect controller may take control of the interconnect by initiating a dummy transaction. The controller can then perform an impedance compensation update operation while it is assured that no data transfers are occurring. After an appropriate settling time and after a transmission of an alignment primitive, the controller can complete the dummy transaction by issuing a no-op. This process may be re-performed periodically.

12 Claims, 8 Drawing Sheets

IN-PROTOCOL IMPEDANCE COMPENSATION CONTROL

FIELD OF THE INVENTION

The present invention pertains to the field of semiconductor devices. More particularly, this invention pertains to the field of impedance compensation.

BACKGROUND OF THE INVENTION

As silicon process technologies produce smaller and smaller device geometries, and with higher and higher levels of integration as well as increasing clock rates on interconnects, on-die impedance compensation circuits take on a more and more prominent role. Due to the factors mentioned above, it has been found to be necessary to update the compensation circuits more frequently. The updates are required in order to account for changes in device temperature, changing voltages, and process variations. These circuits are typically updated during device operation at periodic intervals. This poses a potential problem for devices operating at high data rates, particularly for those using interface protocols that require continuous data transmission to maintain synchronization. The problem is that when the impedance compensation is updated, the change in impedance may cause signal integrity problems on the interconnect, resulting in potential data corruption.

One protocol that requires continuous data transmission in order to maintain synchronization is the Serial ATA protocol (Serial ATA Specification rev. 1.0 released Jun. 28, 2001). This protocol allows communication between two devices such as a disk controller and a disk drive. The Serial ATA specification provides for a serial interconnect using differential pair signaling. The Serial ATA specification further provides for periodic transmission of alignment primitives. The alignment primitive is a predetermined pattern of bits of a predetermined length that is recognized by devices coupled to the interconnect. The alignment primitive allows devices that have lost synchronization to recover bit-boundary alignment.

The Serial ATA protocol, as well as some other protocols, do not set aside any time for impedance compensation update operations. What is needed is a capability of performing impedance compensation update operations without adversely disturbing the continuous flow of data.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of a technique for performing impedance compensation update operations without causing potential data corruption problems includes taking advantage of interconnect protocol idle periods, where synchronization primitives, filler data, and alignment primitives are being transmitted. For example, a Serial ATA controller may take control of the interconnect by initiating a dummy transaction. The controller can then perform an impedance compensation update operation while it is assured that no data transfers are occurring. After an appropriate settling time and after a transmission of an alignment primitive, the controller can complete the dummy transaction by issuing a no-op data frame. This process may be re-performed periodically.

Figure 1:
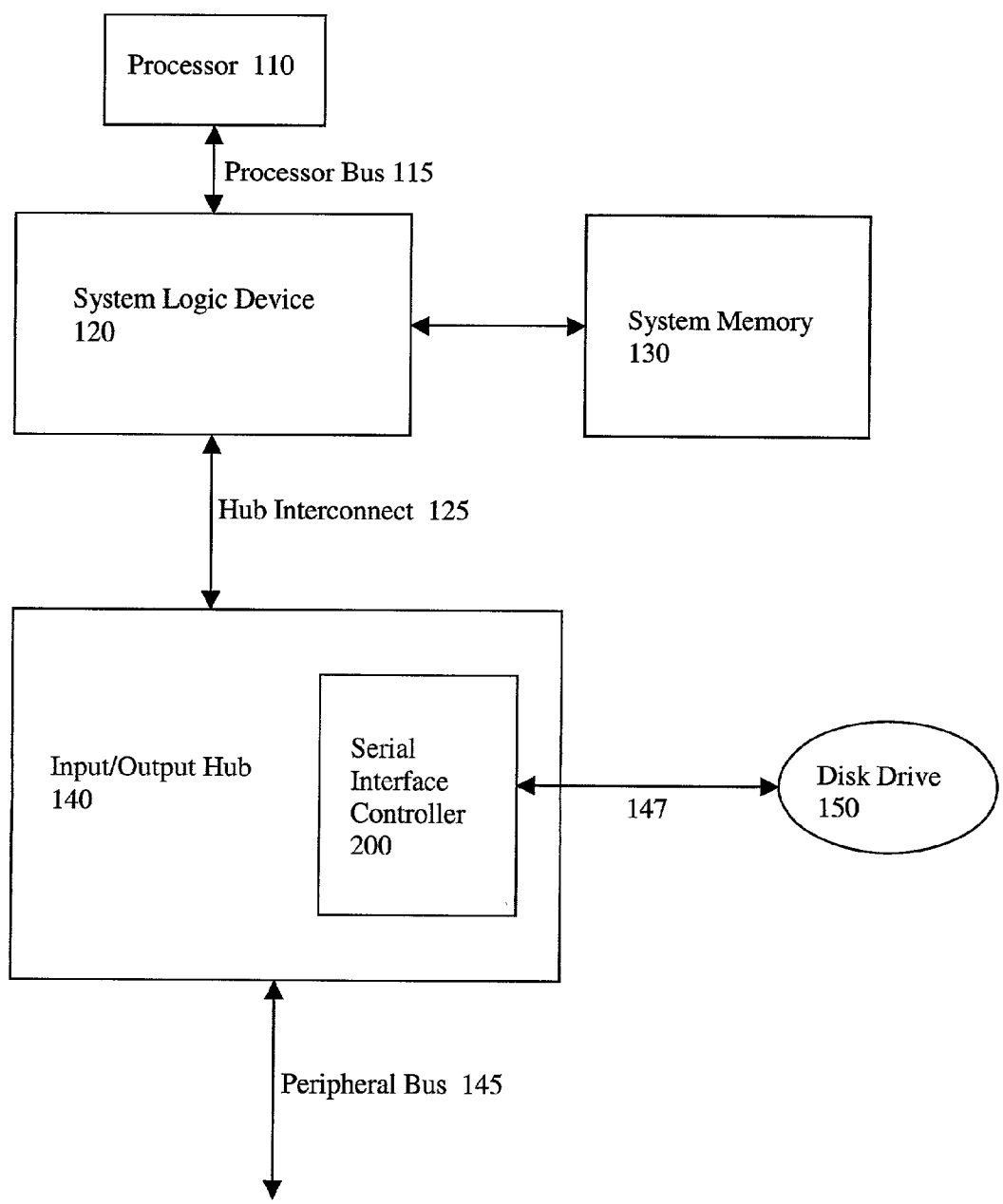
FIG. 1 is a block diagram of one embodiment of a computer system including a serial interface controller coupled to a disk drive.

FIG. 1 is a block diagram of one embodiment of a computer system 100 including a serial interface controller 200 coupled to a disk drive 150. The serial interface controller 200 is included in an input/output hub 140 which is also coupled to a peripheral bus 145.

The computer system 100 also includes a system logic device 120 that is coupled to the input/output hub 140 via a hub interconnect 125. The system logic device 120 is coupled to a processor 110 and is also coupled to a system memory 130.

The serial interface controller 200 is coupled to the disk drive 150 via an interconnect 147. For this example embodiment, the interconnect 147 is implemented in accordance with the Serial ATA specification. Other embodiments are possible using other interconnect implementations, including parallel bus implementations. For this example embodiment, the interconnect 147 includes one differential pair of signals that deliver data from the controller 200 to the disk drive 150 and another differential pair of signals that deliver data from the disk drive 150 to the controller 200.

Figure 2:
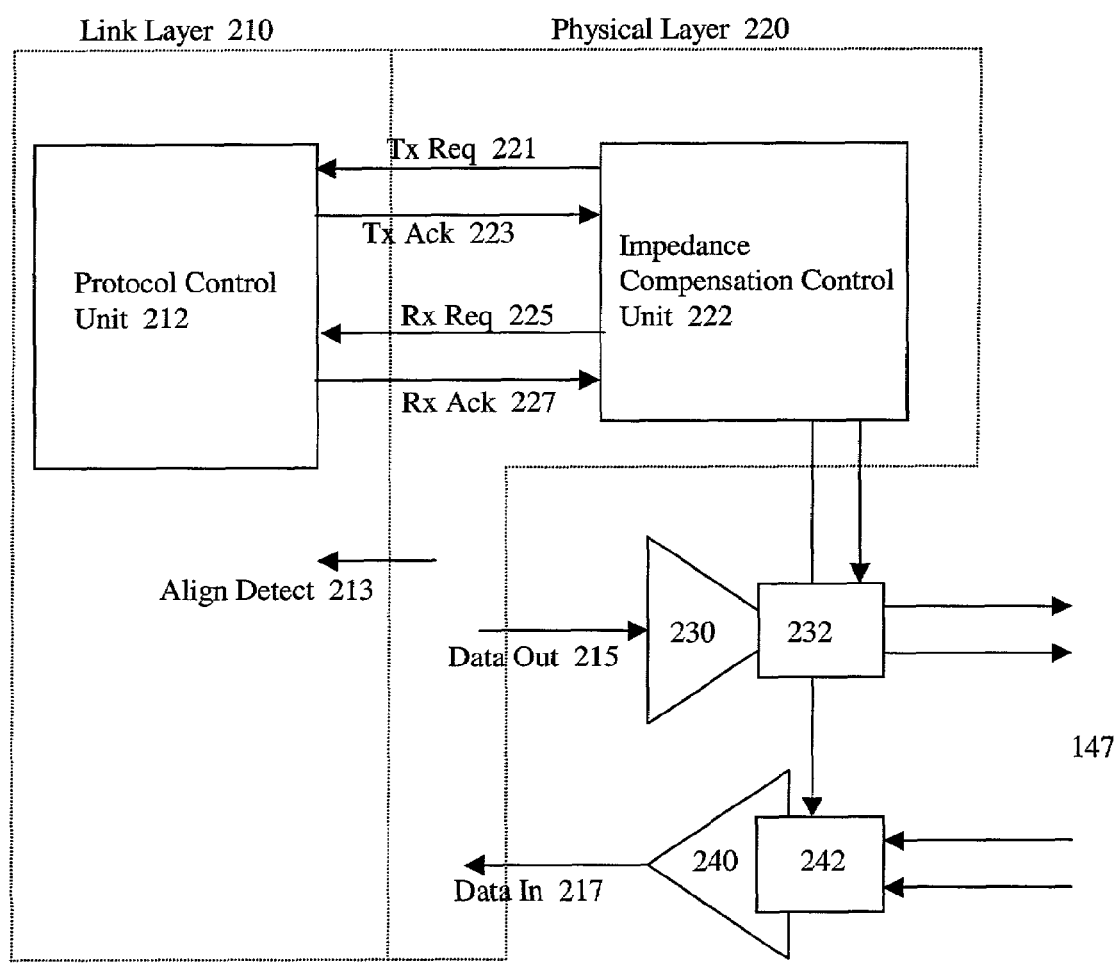
FIG. 2 is a block diagram of one embodiment of a serial interface controller including a protocol control unit and an impedance compensation control unit.

FIG. 2 is a block diagram of one embodiment of the serial interface controller 200 including a protocol control unit 212 and an impedance compensation control unit 222. Some of the functions of the controller 200 may be abstracted into a link layer 210 and a physical layer 220. The link layer 210 handles the formation and decoding of packets and is also aware of the state of the interconnect 147. The physical layer 220 provides the actual connections to the interconnect 147 and also includes impedance compensation circuitry. For this embodiment, the protocol control unit 212 is part of the link layer 210 and the impedance compensation control unit 222 is part of the physical layer 220.

The serial interface controller 200 includes a transmitter 230 that receives outgoing data (data out 215) from the physical layer 220. The transmitter 230 is coupled to an impedance control circuit 232.

The serial interface controller 200 also includes a receiver 240 that delivers incoming data (data in 217) to the physical layer 220. The receiver 240 is coupled to an impedance control circuit 242.

The impedance control circuits 232 and 242 are coupled to the impedance compensation control unit 222. During an impedance compensation update operation, new values are delivered from the impedance compensation control unit 222 to the impedance control circuits 232 and 242.

The impedance compensation control unit 222 communicates with the protocol control unit 212 by way of a transmitter compensation request signal (Tx Req 221), a transmitter compensation acknowledge signal (Tx Ack 223), a receiver compensation request signal (Rx Req 225), and a receiver compensation acknowledge signal (Rx Ack 227).

The discussions below in connection with FIGS. 3 through 8 will detail the impedance compensation update operations of the controller 200. In general, the impedance compensation control unit 222 periodically asserts one of the request signals 221 or 225 indicating a desire to perform an impedance compensation update operation. The protocol control unit 212 completes any current data transmit or receive operations then takes control of the interconnect 147 by initiating a dummy operation. The protocol control unit 212 then asserts one of the acknowledge signals 223 or 227. The impedance compensation control unit 222 then is free to deliver new values to the impedance control circuits 232 and 242. After allowing for a settling time and after waiting for an alignment primitive to be transmitted, the impedance compensation control unit 222 deasserts the request signal. The protocol control unit 212 then deasserts the acknowledge signal. The protocol control unit 212 then transmits a no-op. The no-op may be a null-update of a control register or a status register. A "null-update" signifies that there is no change to any of the register contents. The transmission of the no-op completes the previously initiated dummy operation. Normal operation then resumes. By following the process just outlined, the serial interconnect protocol (in this example case the protocol adhering to the Serial ATA specification) is used to create a window in which the impedance compensation update can occur without risking data corruption.

The alignment primitive mentioned above is generated periodically by the physical layer 220. For this example embodiment, the alignment primitive is transmitted after every 256 double words of data. By waiting for an alignment primitive to be transmitted before resuming normal operation following an impedance compensation update operation, any bit-synchronization problems caused by the change in impedance are cured before any data corruption can occur.

The physical layer 220 alerts the link layer 210 of the reception of an alignment primitive at the receiver 240 by asserting an alignment detect signal 213.

Figure 3:
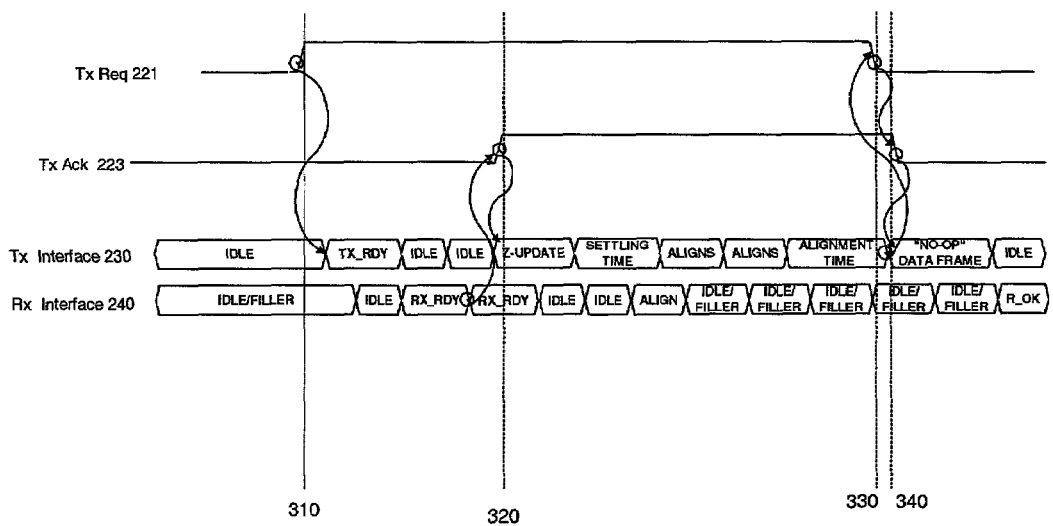
FIG. 3 is a timing diagram showing in-protocol impedance compensation where the sequence begins with a transmitter calibration request signal that is asserted during idle interface operations.

FIG. 3 is a timing diagram showing in-protocol impedance compensation where the sequence begins with the transmitter calibration request signal 221 asserted during idle interface operations. At time 310, the transmitter interface 230 is generating idle packets. The transmitter compensation request signal (Tx Req 221) is asserted at time 310. The assertion of the Tx Req signal 221 indicates that the impedance compensation control unit 222 desires to update the impedance control circuit 232.

In response to the assertion of the Tx Req signal 221, a transmitter ready packet (TX_RDY) is transmitted. A receiver ready packet (RX_RDY) is received shortly thereafter. For this example embodiment, the device at the other end of the interconnect 147 is the disk drive 150. When the RX_RDY packet is received, the protocol control unit 212 knows that the controller 200 commands the interface 147. The protocol control unit 212 then asserts the transmitter compensation acknowledge signal (Tx Ack 223) at time 320.

In response to the assertion of the Tx Ack signal 223, the impedance compensation control unit 222 performs the impedance compensation update operation by delivering new values to the impedance control circuit 232. Following a settling time and following at least one alignment primitive transmission, the Tx Req signal 221 is deasserted at time 330. In response to the deassertion of the Tx Req signal 221, the Tx Ack signal 223 is deasserted and the protocol control unit 212 issues a no-op at time 340. Following the transmission of the no-op, the disk drive 150 responds with a "receiver OK" packet (R_OK) indicating that the no-op packet was received. The interface 147 then resumes normal operation.

Figure 4:
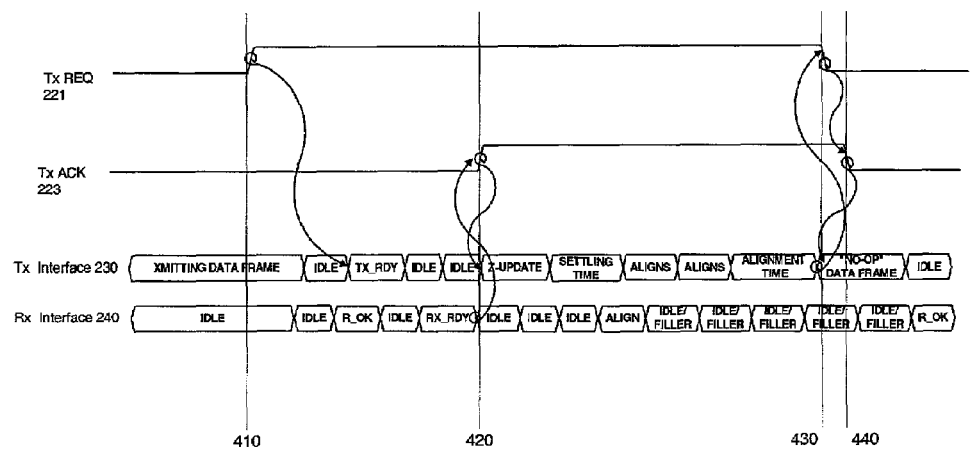
FIG. 4 is a timing diagram showing in-protocol impedance compensation where the sequence begins with a transmitter calibration request signal that is asserted during transmitting operations.

FIG. 4 is a timing diagram showing in-protocol impedance compensation where the sequence begins with the transmitter calibration request signal (Tx Req 221) asserted during transmitting operations. At time 410, the transmitter interface 230 is transmitting data packets. The transmitter compensation request signal (Tx Req 221) is asserted at time 410. The assertion of the Tx Req signal 221 indicates that the impedance compensation control unit 222 desires to update the impedance control circuit 232.

In response to the assertion of the Tx Req signal 221, and following the reception of the R_OK packet, a transmitter ready packet (TX_RDY) is transmitted. A receiver ready packet (RX_RDY) is received shortly thereafter. When the RX_RDY packet is received, the protocol control unit 212 knows that the controller 200 commands the interface 147. The protocol control unit 212 then asserts the transmitter compensation acknowledge signal (Tx Ack 223) at time 420.

In response to the assertion of the Tx Ack signal 223, the impedance compensation control unit 222 performs the impedance compensation update operation by delivering new values to the impedance control circuit 232. Following a settling time and following at least one alignment primitive transmission, the Tx Req signal 221 is deasserted at time 430. In response to the deassertion of the Tx Req signal 221, the Tx Ack signal 223 is deasserted and the protocol control unit 212 issues a no-op at time 430. Following the transmission of the no-op, the disk drive 150 responds with a "receiver OK" packet (R_OK) indicating that the no-op packet was received. The interface 147 then resumes normal operation.

Figure 5:
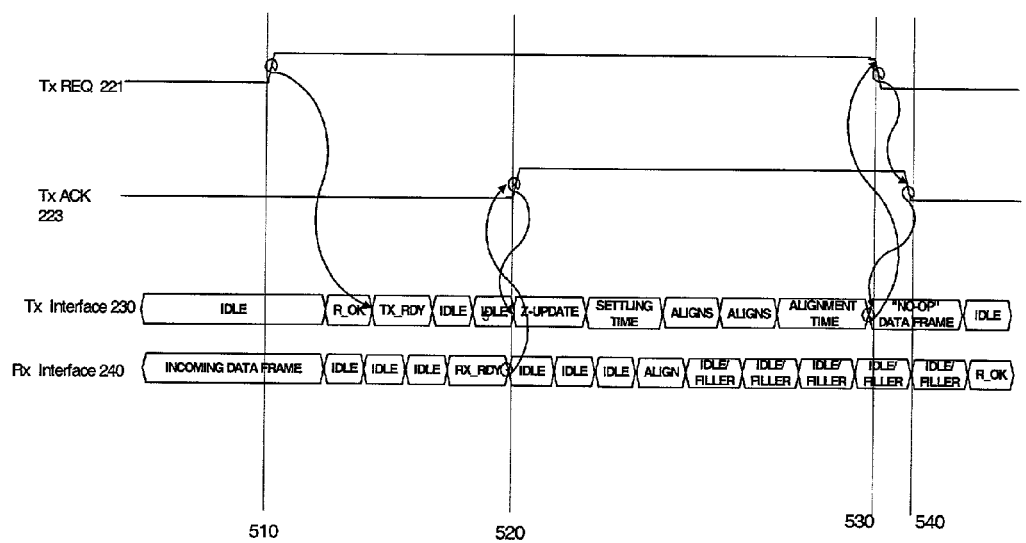
FIG. 5 is a timing diagram showing in-protocol impedance compensation where the sequence begins with a transmitter calibration request signal that is asserted during receiving operations.

FIG. 5 is a timing diagram showing in-protocol impedance compensation where the sequence begins with the transmitter calibration request signal (Tx Req 221) asserted during receiving operations. At time 510, the receiver interface 240 is receiving data packets. The transmitter compensation request signal (Tx Req 221) is asserted at time 510. The assertion of the Tx Req signal 221 indicates that the impedance compensation control unit 222 desires to update the impedance control circuit 232.

In response to the assertion of the Tx Req signal 221, and following the transmission of an R_OK packet, a transmitter ready packet (TX_RDY) is transmitted. A receiver ready packet (RX_RDY) is received shortly thereafter. When the RX_RDY packet is received, the protocol control unit 212 knows that the controller 200 commands the interface 147. The protocol control unit 212 then asserts the transmitter compensation acknowledge signal (Tx Ack 223) at time 520.

In response to the assertion of the Tx Ack signal 223, the impedance compensation control unit 222 performs the impedance compensation update operation by delivering new values to the impedance control circuit 232. Following a settling time and following at least one alignment primitive transmission, the Tx Req signal 221 is deasserted at time 530. In response to the deassertion of the Tx Req signal 221, the Tx Ack signal 223 is deasserted and the protocol control unit 212 issues a no-op at time 530. Following the transmission of the no-op, the disk drive 150 responds with a "receiver OK" packet (R_OK) indicating that the no-op packet was received. The interface 147 then resumes normal operation.

Figure 6:
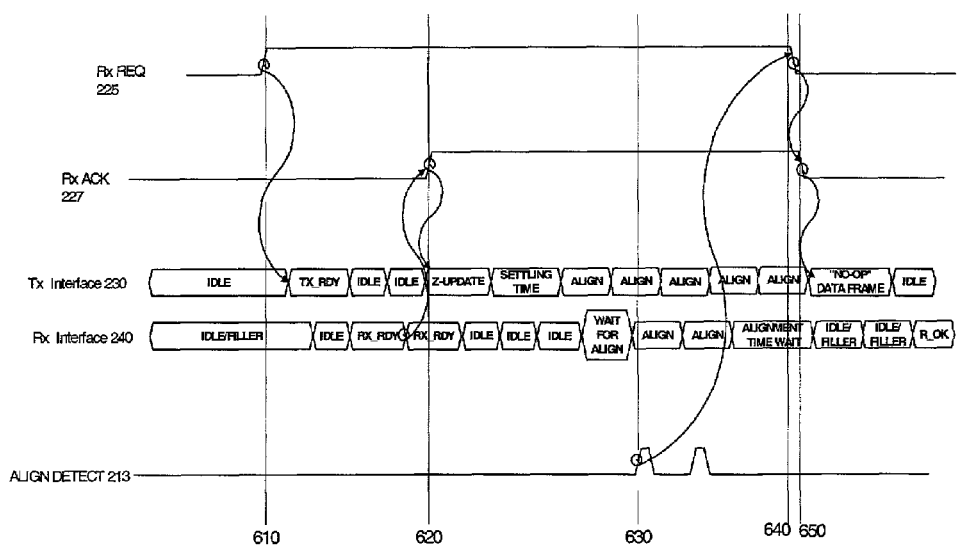
FIG. 6 is a timing diagram showing in-protocol impedance compensation where the sequence begins with a receiver calibration request signal that is asserted during idle interface operations.

FIG. 6 is a timing diagram showing in-protocol impedance compensation where the sequence begins with the receiver calibration request signal (Rx Req 225) asserted during idle interface operations. The Rx Req signal 225 is asserted at time 610. The assertion of the Rx Req signal 225 indicates that the impedance compensation control unit desires to update the impedance control circuit 242. In response to the assertion of the Rx Req signal 225, the protocol control unit 212 issues a transmitter ready packet (TX_RDY). A receiver ready packet (RX_RDY) is then received.

At time 620, the receiver calibration acknowledge signal (Rx Ack 227) is asserted in response to the reception of the RX_RDY packet. The impedance compensation control unit 222 then performs an impedance compensation update operation by delivering new values to the impedance control circuit 242.

Because the impedance control circuit 242, which is coupled to the receiver 240, has been updated, the impedance compensation control unit must wait for a settling time and must also wait until an alignment primitive is received at the receiver 240 before deasserting the Rx Req signal 225. When the align primitive is seen at receiver 240, the physical layer 220 asserts the align detect signal 213 at time 630. Following the reception of the alignment primitive, the impedance compensation control unit 222 is free to deassert the Rx Req signal 225, which occurs at time 640. At time 650, a no-op packet is transmitted and then an R_OK packet is received. Normal operation then resumes.

Figure 7:
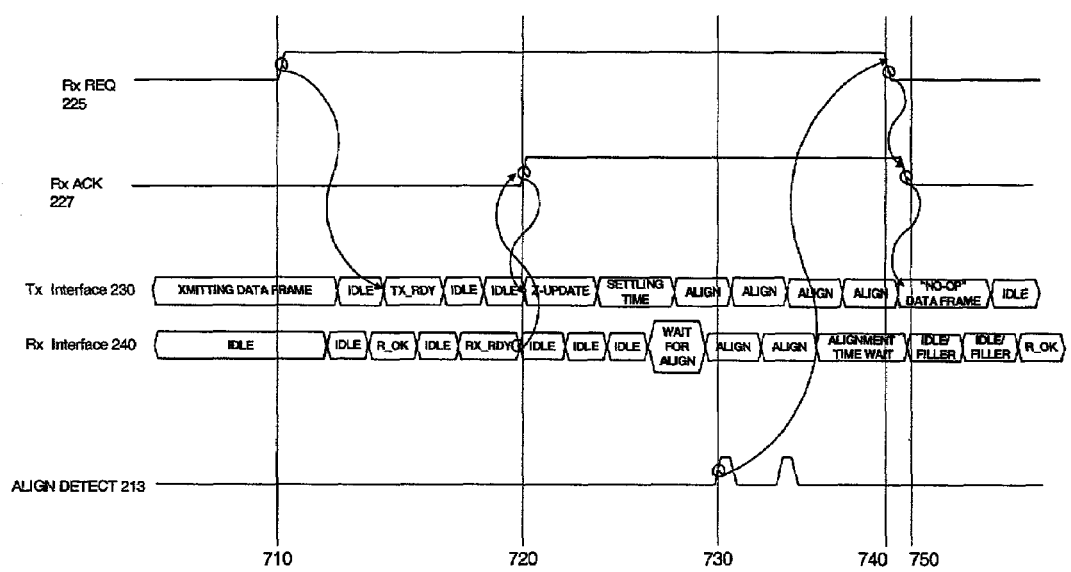
FIG. 7 is a timing diagram showing in-protocol impedance compensation where the sequence begins with a receiver calibration request signal that is asserted during transmitting operations.

FIG. 7 is a timing diagram showing in-protocol impedance compensation where the sequence begins with the receiver calibration request signal (Rx Req 225) asserted during transmitting operations. The Rx Req signal 225 is asserted at time 710. The assertion of the Rx Req signal 225 indicates that the impedance compensation control unit desires to update the impedance control circuit 242. In response to the assertion of the Rx Req signal 225, and following the reception of an R_OK packet indicating that the data transmission has concluded, the protocol control unit 212 issues a transmitter ready packet (TX_RDY). A receiver ready packet (RX_RDY) is then received.

At time 720, the receiver calibration acknowledge signal (Rx Ack 227) is asserted in response to the reception of the RX_RDY packet. The impedance compensation control unit 222 then performs an impedance compensation update operation by delivering new values to the impedance control circuit 242.

Because the impedance control circuit 242, which is coupled to the receiver 240, has been updated, the impedance compensation control unit must wait for a settling time and must also wait until an alignment primitive is received at the receiver 240 before deasserting the Rx Req signal 225. When the align primitive is seen at receiver 240, the physical layer 220 asserts the align detect signal 213 at time 730. Following the reception of the alignment primitive, the impedance compensation control unit 222 is free to deassert the Rx Req signal 225, which occurs at time 740. At time 750, a no-op packet is transmitted and then an R_OK packet is received. Normal operation then resumes.

Figure 8:
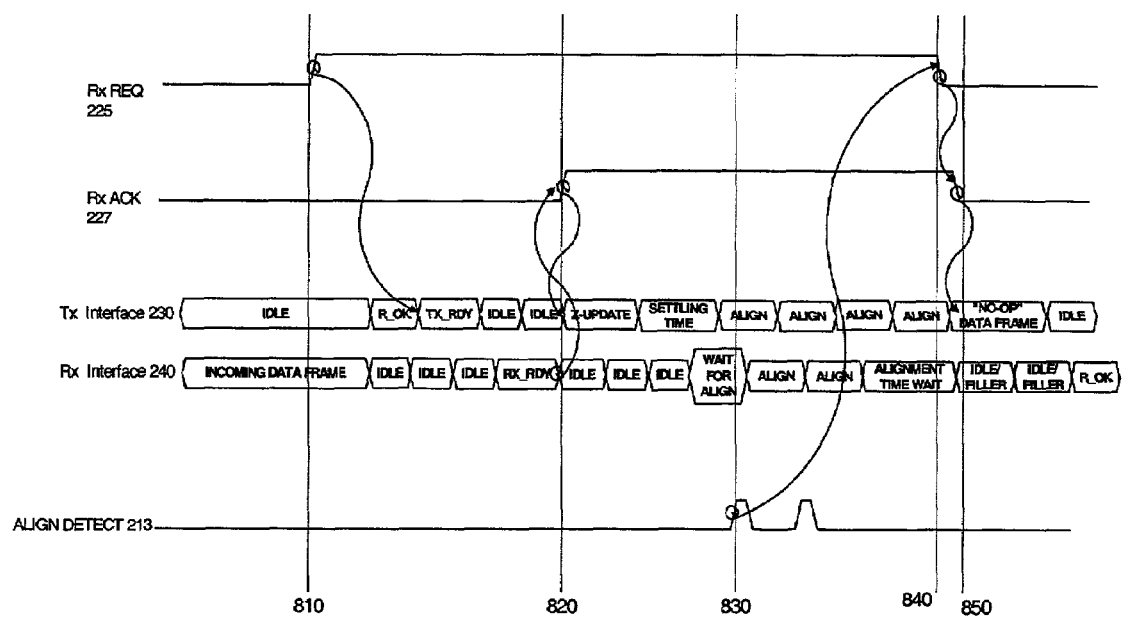
FIG. 8 is a timing diagram showing in-protocol impedance compensation where the sequence begins with a receiver calibration request signal that is asserted during receiving operations.

FIG. 8 is a timing diagram showing in-protocol impedance compensation where the sequence begins with the receiver calibration request signal (Rx Req 225) asserted during receiving operations. The Rx Req signal 225 is asserted at time 810. The assertion of the Rx Req signal 225 indicates that the impedance compensation control unit desires to update the impedance control circuit 242. In response to the assertion of the Rx Req signal 225, and following the transmission of an R_OK packet indicating that the incoming data has been received, the protocol control unit 212 issues a transmitter ready packet (TX_RDY). A receiver ready packet (RX_RDY) is then received.

At time 820, the receiver calibration acknowledge signal (Rx Ack 227) is asserted in response to the reception of the RX_RDY packet. The impedance compensation control unit 222 then performs an impedance compensation update operation by delivering new values to the impedance control circuit 242.

Because the impedance control circuit 242, which is coupled to the receiver 240, has been updated, the impedance compensation control unit must wait for a settling time and must also wait until an alignment primitive is received at the receiver 240 before deasserting the Rx Req signal 225. When the align primitive is seen at receiver 240, the physical layer 220 asserts the align detect signal 213 at time 830. Following the reception of the alignment primitive, the impedance compensation control unit 222 is free to deassert the Rx Req signal 225, which occurs at time 840. At time 850, a no-op packet is transmitted and then an R_OK packet is received. Normal operation then resumes.

The timing relationships shown in FIGS. 3 through 8 are not intended to be drawn to scale, and are merely intended to illustrate the sequences of events that occur with these example embodiments.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:
1. A controller, comprising:
   a transmitter interface unit including an updateable impedance compensation circuit;
   an impedance compensation control unit coupled to the impedance compensation circuit; and a protocol control unit coupled to the impedance compensation control unit, the protocol control unit to detect at least one serial interface protocol idle period when at least one idle interface operation is being performed over an interconnect to direct the impedance compensation control unit to perform an impedance compensation update operation to update an impedance compensation value of the impedance compensation circuit during the detected at least one serial interface protocol idle period to reduce data corruption, wherein the serial interface protocol idle period to perform the impedance compensation update operation is when idle packets are being transmitted over the interconnect.

2. The controller of claim 1, wherein the protocol control unit asserts an acknowledge signal to the impedance compensation control unit, the impedance compensation control unit to perform the impedance compensation update operation in response to the assertion of the acknowledge signal.

3. The controller of claim 2, further comprising a receiver interface, the receiver interface and the transmitter interface unit to couple to an interconnect, the interconnect to provide a connection with an external device.

4. A method, comprising:

determining a period of time when idle packets are being transferred over the interconnect to detect at least one serial interface protocol idle period when at least one idle interface operation is being performed over the interconnect;

transmitting a transmitter ready packet over the interconnect during the at least one serial interface protocol idle period; and asserting a request signal to direct an impedance compensation control unit to invoke an impedance compensation operation to update an impedance compensation value of an impedance compensation circuit during the detected serial interface protocol idle period to reduce data corruption once control of an interface to the interconnect is secured.

5. The method of claim 4, further comprises:

receiving a receiver ready packet; and detecting that the control of the interface is secure in response to receiving the receiver ready packet.

6. The method of claim 5, further comprising:

delivering a request signal from an impedance compensation control unit to a protocol control unit, the delivering of the request to occur detecting the at least one serial interface protocol idle period when idle packets are being transferred over the interconnect.

7. The method of claim 6, further comprising delivering an acknowledge signal from the protocol control unit to the impedance compensation control unit, the delivering of the acknowledge signal to occur in response to the detecting the at least one serial interface protocol idle period.

8. The method of claim 7, wherein invoking the impedance compensation operation during the period of time when idle packets are being transferred over the interconnect occurs in response to the delivering of the acknowledge signal from the protocol control unit to the impedance compensation control unit.

9. A system, comprising:

an input/output (I/O) controller hub including:

a controller having a transmitter interface unit including an updateable impedance compensation circuit, an impedance compensation control unit to update the impedance compensation circuit in response to an impedance compensation update operation, and a protocol control unit coupled to the impedance compensation control unit, the protocol control unit to detect at least one serial interface protocol idle period when at least one idle interface operation is being performed over the interconnect to direct the impedance compensation control unit to invoke the impedance compensation update operation to update an impedance compensation value of the impedance compensation circuit during the detected at least one serial interface protocol idle period to reduce data corruption; and a device coupled to the controller via an interconnect, the interconnect coupled to the interface unit of the controllers, wherein the at least one serial interface protocol idle period to perform the impedance compensation update operation is when idle frames are being transmitted over the interconnect.

10. The system of claim 9, wherein the interconnect is a serial interconnect with one data stream flowing from the controller to the device and another data stream flowing from the device to the controller.

11. The system of claim 10, wherein the interconnect is implemented using differential pair signaling.

12. The system of claim 11, wherein the controller is a serial interconnect controller and the device is a disk drive.

* * * * *